(12) United States Patent
Tomita et al.

(10) Patent No.: US 12,197,942 B2
(45) Date of Patent: Jan. 14, 2025

(54) INFORMATION PROCESSING APPARATUS, INFORMATION PROCESSING METHOD, NON-TRANSITORY STORAGE MEDIUM, AND INFORMATION PROCESSING SYSTEM

(71) Applicants: KABUSHIKI KAISHA TOSHIBA, Tokyo (JP); Kioxia Corporation, Tokyo (JP)

(72) Inventors: Masashi Tomita, Yokohama Kanagawa (JP); Daiki Kiribuchi, Tokyo (JP); Satoru Yokota, Yokohama Kanagawa (JP); Soh Koike, Tokyo (JP)

(73) Assignees: Kabushiki Kaisha Toshiba, Tokyo (JP); Kioxia Corporation, Tokyo (JP)

( * ) Notice: Subject to any disclaimer, the term of this patent is extended or adjusted under 35 U.S.C. 154(b) by 650 days.

(21) Appl. No.: 17/470,569

(22) Filed: Sep. 9, 2021

(65) Prior Publication Data

US 2022/0244987 A1 Aug. 4, 2022

(30) Foreign Application Priority Data

Feb. 2, 2021 (JP) ................................. 2021-015257

(51) Int. Cl.
*G06F 9/48* (2006.01)
*G06N 7/01* (2023.01)

(52) U.S. Cl.
CPC ............ *G06F 9/4843* (2013.01); *G06N 7/01* (2023.01)

(58) Field of Classification Search
CPC ................................ G06F 9/4843; G06N 7/01
See application file for complete search history.

(56) References Cited

U.S. PATENT DOCUMENTS

| 10,257,275 B1* | 4/2019 | Dirac | H04L 67/1097 |
|---|---|---|---|
| 10,761,518 B2 | 9/2020 | Yamazaki | |
| 11,055,454 B1* | 7/2021 | Gasser | G06F 30/20 |
| 2019/0171776 A1* | 6/2019 | Huang | G06N 7/01 |
| 2019/0266503 A1* | 8/2019 | Onishi | G06N 5/04 |
| 2020/0050717 A1* | 2/2020 | Kiribuchi | G06F 30/20 |
| 2020/0327264 A1* | 10/2020 | Wang | H02J 3/008 |
| 2021/0133375 A1* | 5/2021 | Zagayevskiy | E21B 21/08 |

FOREIGN PATENT DOCUMENTS

| JP | 2018-73360 A | 5/2018 |
|---|---|---|
| JP | 2020-52737 A | 4/2020 |
| WO | WO 2017/187517 A1 | 11/2017 |

* cited by examiner

*Primary Examiner* — Dong U Kim
(74) *Attorney, Agent, or Firm* — Finnegan, Henderson, Farabow, Garrett & Dunner, LLP

(57) ABSTRACT

One embodiment of the invention provides an apparatus preventing degradation of accuracy of a search result while reducing a total required period of a series of processing in a case where input parameters for a series of processing including a plurality of processing with different required periods are searched for. The apparatus includes a calculator and a generator. The calculator calculates evaluation values for output parameters of a series of processing including first processing and second processing. The first processing uses a first input parameter. The second processing use a second input parameter. The generator regenerates first and second input parameters corresponding to one time of a series of processing based on first and second input parameters corresponding to selected output parameters. The number of input parameters for shorter one of the first and the second processing is larger than the number of input parameters for the other.

15 Claims, 13 Drawing Sheets

| ELEMENT ($x_{1\_k}$) OF X1 | VALUE |
|---|---|
| $x_{1\_1}$ | 0.5 |
| $x_{1\_2}$ | 230 |
| $x_{1\_3}$ | 12 |
| $x_{1\_4}$ | 0.5 |
| ...... | ...... |
| $x_{1\_50}$ | 12 |

FIG. 4

| ELEMENT ($u_{1\_k}$) OF U1 | VALUE |
|---|---|
| $u_{1\_1}$ | 28 |
| $u_{1\_2}$ | 32 |
| $u_{1\_3}$ | 0.15 |
| $u_{1\_4}$ | 1 |
| ...... | ...... |
| $u_{1\_10}$ | 12 |

FIG. 5

| | Z1 | Z2 | ... | Z100 |
|---|---|---|---|---|
| 1ST ELEMENT | 0.5 | 0.963 | ... | 13 |
| 2ND ELEMENT | 2.3 | 15 | ... | 1.2 |

FIG. 6

|  | Y1(U1, Z1) | Y2(U1,Z2) | ... | Y100(U1,Z100) |
|---|---|---|---|---|
| 1ST ELEMENT | 1.8 | 2.7 | ... | 13 |
| 2ND ELEMENT | 1.89 | 3.3 | ... | 5.3 |
| 3RD ELEMENT | 2 | 10 | ... | 0.5 |
| 4TH ELEMENT | 2.3 | 5.1 | ... | 2.8 |
| 5TH ELEMENT | 3.5 | 2.9 | ... | 1.9 |
| 6TH ELEMENT | 4.1 | 5.8 | ... | 2.4 |

FIG. 7

|  | Y1(U1, Z1) | Y2(U1, Z2) | ... | Y100(U1, Z100) |
| --- | --- | --- | --- | --- |
| EVALUATION VALUE BASED ON 1ST EVALUATION FUNCTION | 5.8 | 5.5 | ... | 4.3 |
| EVALUATION VALUE BASED ON 2ND EVALUATION FUNCTION | 2.5 | 3.3 | ... | 3.8 |

FIG. 8

| FIRST PROCESSING APPARATUS | | SECOND PROCESSING APPARATUS | | EVALUATION VALUE | SELECT |
|---|---|---|---|---|---|
| INPUT | OUTPUT | INPUT | OUTPUT | | |
| X1 | U1 | (U1, Z1) | Y1 | OBJ1 | NO |
| X1 | U1 | (U1, Z2) | Y2 | OBJ2 | YES |
| ⋯ | ⋯ | ⋯ | ⋯ | ⋯ | ⋯ |
| X1 | U1 | (U1, Z100) | Y100 | OBJ100 | NO |
| X2 | U2 | (U2, Z101) | Y101 | OBJ101 | YES |
| X2 | U2 | (U2, Z102) | Y102 | OBJ102 | NO |
| ⋯ | ⋯ | ⋯ | ⋯ | ⋯ | ⋯ |
| X2 | U2 | (U2, Z200) | Y200 | OBJ200 | NO |
| X3 | U3 | (U3, Z201) | Y201 | OBJ201 | NO |
| X3 | U3 | (U3, Z202) | Y202 | OBJ202 | NO |
| ⋯ | ⋯ | ⋯ | ⋯ | ⋯ | ⋯ |
| X3 | U3 | (U3, Z300) | Y300 | OBJ300 | YES |

FIG. 9

| No | x | | | u | | | z | | | Y | | | PERIOD | | THE NUMBER OF TIMES OF EXECUTION OF SERIES OF PROCESSING | EVALUATION VALUE | | |
|---|---|---|---|---|---|---|---|---|---|---|---|---|---|---|---|---|---|---|
| | FIRST ELEMENT | ... | LAST ELEMENT | FIRST ELEMENT | ... | LAST ELEMENT | FIRST ELEMENT | ... | LAST ELEMENT | FIRST ELEMENT | ... | LAST ELEMENT | FIRST SUB-PROCESSING | SECOND SUB-PROCESSING | | EVALUATION VALUE OF FIRST ELEMENT | ... | EVALUATION VALUE OF LAST ELEMENT |
| 1 | 0.5 | ... | 12 | 28 | ... | 12 | 0.5 | ... | 13 | 1.8 | ... | 13 | 6253 | 13 | 1 | 5.8 | ... | 2.5 |
| 2 | 2 | ... | 1 | 0.436 | ... | 0.54 | 0.5 | ... | 13 | 2 | ... | 0.5 | 4646 | 52 | 2 | 4.9 | ... | 2.9 |
| 3 | 6 | ... | 98 | 0.5 | ... | 0.771 | 0.5 | ... | 13 | 3.5 | ... | 1.9 | 5874 | 23 | 3 | 2 | ... | 5 |

FIG. 10

INFORMATION PROCESSING APPARATUS, INFORMATION PROCESSING METHOD, NON-TRANSITORY STORAGE MEDIUM, AND INFORMATION PROCESSING SYSTEM

CROSS-REFERENCE TO RELATED APPLICATION (S)

This application is based upon and claims the benefit of priority from Japanese Patent Application No. 2021-015257, filed Feb. 2, 2021; the entire contents of which are incorporated herein by reference.

FIELD

Embodiments described herein relate generally to an information processing apparatus, an information processing method, a non-transitory storage medium, and an information processing system.

BACKGROUND

As a method for efficiently searching for a favorable input parameter which makes an objective function a maximum or a minimum, a Bayesian optimization method is known. In the Bayesian optimization method, an acquisition function is created on the basis of a result of a simulation or the like, and an input parameter which makes the current acquisition function a maximum is determined as the next input parameter. It is known that use of the Bayesian optimization method in a simulation which takes time can make knowledge of technical experts non-essential, and thus, a period for efficiently searching for an input parameter can be reduced.

However, there can be a case where it is difficult to shorten the period even if the Bayesian optimization is used. For example, there is a case where an input parameter which is to be used in each sub-simulation of a series of simulations which sequentially executes a plurality of sub-simulations is searched for. In this case, if Bayesian optimization is performed on the series of simulations, it takes an enormous period of time for calculation, and a search period cannot be shortened so much.

BRIEF DESCRIPTION OF THE DRAWINGS

FIG. 4 is a diagram illustrating an example of a 1st first input parameter "X1";

FIG. 5 is a diagram illustrating an example of a parameter "U";

FIG. 6 is a diagram illustrating an example of a parameter "Z";

FIG. 7 is a diagram illustrating an example of a parameter "Y";

FIG. 8 is a diagram illustrating an example of an evaluation value to be calculated;

FIG. 9 is a diagram explaining selection;

FIG. 10 is a diagram illustrating an example of data regarding a selected parameter to be stored in a storage;

DETAILED DESCRIPTION

One embodiment of the present invention provides an apparatus, or the like, which prevents degradation in accuracy of a search result while reducing a total required period of a series of processing in a case where input parameters for a series of processing including a plurality of processing with different required periods are searched for.

An apparatus which is one embodiment of the present invention includes a calculator and a generator. The calculator calculates evaluation values for output parameters of a series of processing including first processing and second processing, the first processing using a first input parameter and the second processing using a second input parameter. The generator regenerates first and second input parameters corresponding to one time of a series of processing on the basis of first and the second input parameters corresponding to selected output parameters. Further, the number of input parameters generated for one of the first processing and the second processing which has a shorter processing period is larger than the number of input parameters generated for the other.

An embodiment will be explained in detail below with reference to the accompanying drawings. The present invention is not limited to the embodiment.

One Embodiment of the Present Invention

Figure 1:
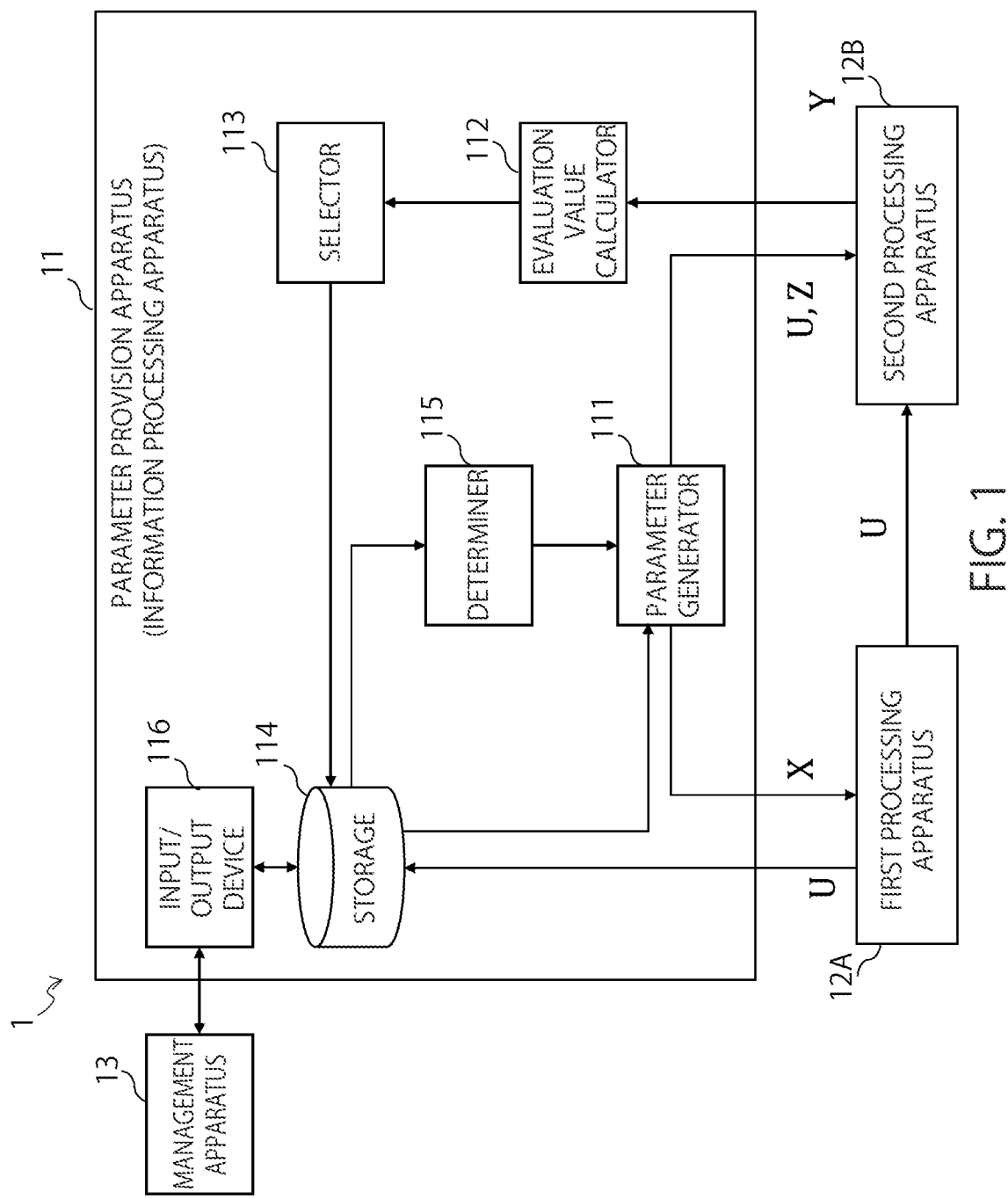
FIG. 1 is a block diagram illustrating an information processing system according to an embodiment of the present invention.

FIG. 1 is a block diagram illustrating an information processing system including a parameter provision apparatus (information processing apparatus) according to one embodiment of the present invention. An information processing system 1 according to the present embodiment includes a parameter provision apparatus (information processing apparatus) 11, a first processing apparatus 12A, a second processing apparatus 12B, and a management apparatus 13. The parameter provision apparatus 11 includes a parameter generator 111, an evaluation value calculator 112, a selector 113, a storage 114, a determiner 115 and an input/output device 116.

Note that a configuration of the present embodiment is an example, and other apparatuses and components may be included. Further, respective apparatuses and components may be subdivided or may be aggregated. In the information processing system, respective processing are often shared by a plurality of apparatuses to disperse processing load, maintain availability, or the like. For example, while the parameter generator 111 generates parameters to be used by the first processing apparatus 12A and the second processing apparatus 12B, the parameter generator 111 may be divided into a first parameter generator which generates a parameter to be used by the first processing apparatus 12A and a second parameter generator which generates a parameter to be used by the second processing apparatus 12B. Further, the input/output device 116 may be divided into an input device and an output device. Further, the information processing apparatus may be divided into an apparatus including the parameter generator 111, and an apparatus including other components. Further, the first processing apparatus 12A and the second processing apparatus 12B do not have to be different apparatuses and may be one apparatus.

The information processing system 1 in the present embodiment searches for a favorable value of an input parameter required for processing such as a simulation. For example, a simulation based on the input parameter is executed, an output parameter which is an execution result is evaluated, and a value of the input parameter is redetermined such that the evaluation becomes higher. Note that a value of an input parameter eventually having the highest evaluation may be selected as an optimal value. Note that a value which is more appropriate than the value selected as the optimal value may actually exist. Further, in the following description, determination and generation of a parameter mean determination of a value of the parameter, not determination of a type of the parameter to be used for a simulation or the like.

Note that processing to which an input parameter is provided may be processing which receives an input parameter and returning an output parameter and may be an experiment which outputs a result corresponding to a certain condition if the processing is executed under the condition. Note that the experiment may be either a chemical experiment or a physical experiment.

Note that the number of input parameters and the number of output parameters are not particularly limited. Thus, in the following description, the input parameter and the output parameter will be dealt with as vectors including one or more elements. Further, content indicated by the input parameter and content indicated by the output parameter are not particularly limited. For example, in a case where a series of processing is an experiment, values of a condition upon the experiment may be set as values of the input parameter. Further, values of the output parameter may be measurement values obtained by various kinds of sensors used in the experiment or physical characteristic values or measurement values output from an experiment result. Values of respective elements of respective parameters may be, for example, continuous values, discrete values or category variables.

Further, it is assumed that a simulation, or the like, to be executed in the information processing system 1 is one overall simulation which is constituted with at least two simulations. Thus, in the following description, the entire simulation, the entire experiment, or the like will be described as a "series of processing", and processing such as partial simulations and partial experiments which constitute a series of processing will be described as "sub-processing". Note that the sub-processing may further include a plurality of partial processing.

In the present embodiment, a series of processing includes first sub-processing and second sub-processing, and the parameter provision apparatus 11 provides input parameters to the first sub-processing and the second sub-processing. The first sub-processing is executed on the basis of an input parameter for the first sub-processing and outputs an output parameter. The second sub-processing is executed on the basis of an input parameter for the second sub-processing and the output parameter of the first sub-processing. Thus, the second sub-processing depends on the output parameter of the first sub-processing.

Further, it is assumed that periods required for executing the sub-processing are different from each other. In the present embodiment, the number of times of execution per one time of a series of processing is made smaller for sub-processing which requires a relatively longer period among respective sub-processing, and the number of times of execution per one time of a series of processing is made larger for sub-processing which requires a relatively shorter period among the respective sub-processing. This shortens a total period for executing a series of processing to be executed by the information processing system.

Note that the sub-processing for which the number of times of execution is made smaller will be also described as sub-processing which is to be executed less times. The sub-processing for which the number of times of execution is made larger will be also described as sub-processing which is to be executed more times. In the present embodiment, the first sub-processing is sub-processing which is to be executed less times, and the second sub-processing is sub-processing which is to be executed more times.

Figure 2:
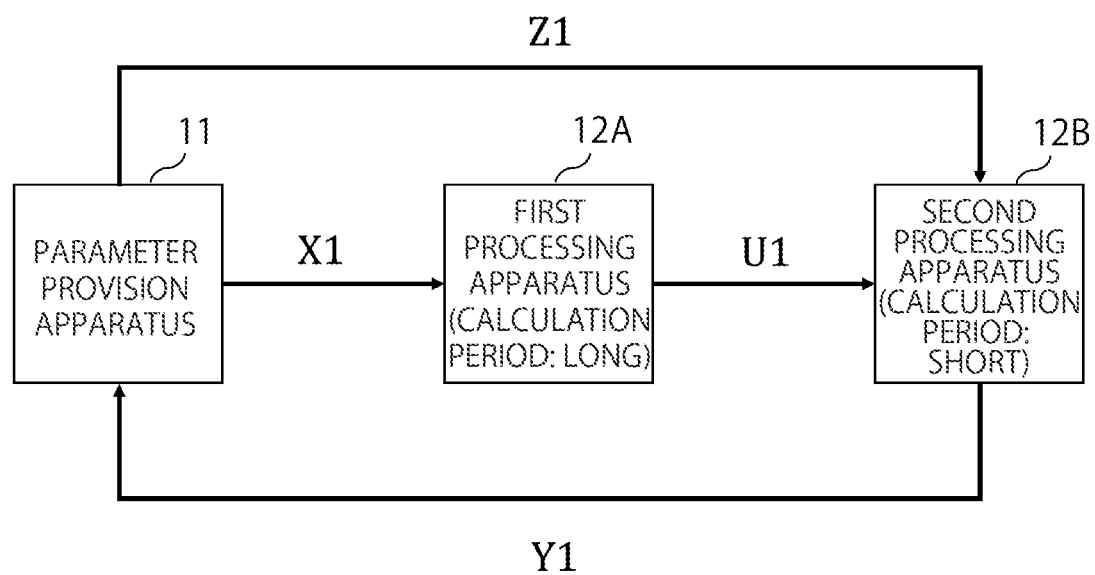
FIG. 2 is a diagram illustrating flow of a simulation in related art.
Figure 3:
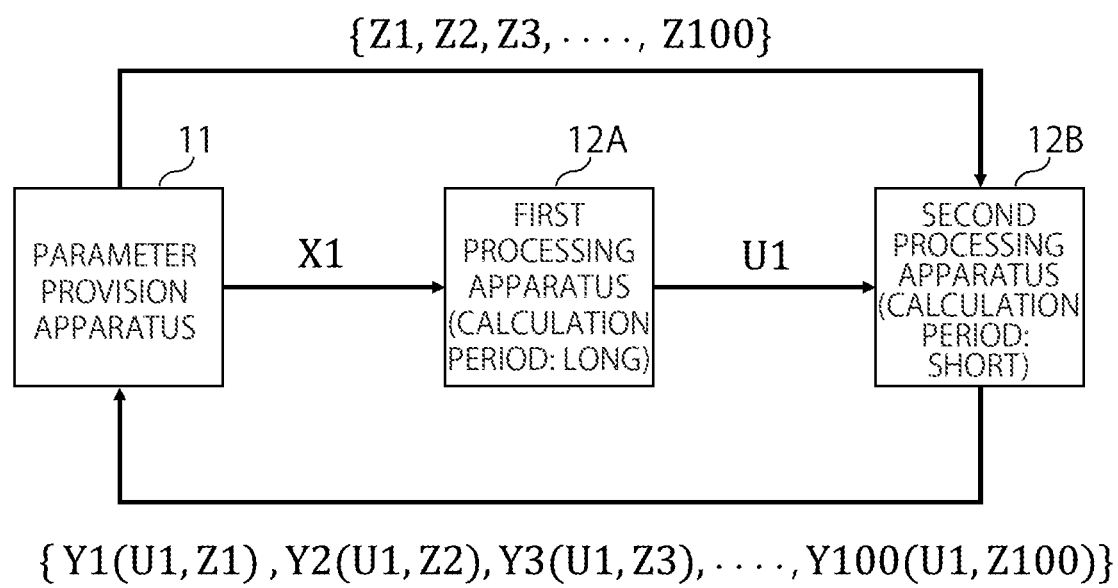
FIG. 3 is a diagram illustrating flow of a simulation in the present embodiment (diagram for one trial)

FIG. 2 and FIG. 3 are diagrams explaining a difference in flow of a series of processing between related art and the present embodiment. FIG. 2 is a diagram illustrating flow of a series of processing in the related art. An alphabetic character "X" indicated in FIG. 2 indicates an input parameter for the first sub-processing, which is generated by the parameter provision apparatus 11. The parameter "X" will be also described as a first input parameter. An alphabetic character "U" in FIG. 2 indicates an output parameter of the first sub-processing and is also an input parameter for the second sub-processing. The parameter "U" will be also described as a first output parameter. An alphabetic character "Z" in FIG. 2 indicates an input parameter for the second sub-processing, which is generated by the parameter provision apparatus 11. The parameter "Z" will be also described as a second input parameter. An alphabetic character "Y" in FIG. 2 indicates an output parameter of the second sub-processing. The parameter "Y" will be also described as a second output parameter. Note that in the example in FIG. 2 and FIG. 3, the first input parameter "X" and the second input parameter "Z" can be also regarded as input parameters of a series of processing, and the second output parameter "Y" can be also regarded as an output parameter of a series of processing.

Further, while a number 1 is provided to each parameter in FIG. 2, this indicates a 1st parameter, and a p-th (where p is an integer equal to or greater than 1) parameter will be described as, for example, "Xp", "Up", or the like. The 1st first input parameter "X1" for the first sub-processing is transmitted from the parameter provision apparatus 11 to the first processing apparatus 12A, and the first processing apparatus 12A performs the first sub-processing on the basis of the input parameter "X1". A parameter "U1" is output from the first processing apparatus 12A through the first sub-processing based on the input parameter "X1". Further, an input parameter "Z1" of the first time for the second processing apparatus 12B is transmitted from the parameter provision apparatus 11 to the second processing apparatus 12B, and the second processing apparatus 12B performs the second sub-processing on the basis of the parameters "Z1" and "U1". An output parameter "Y1" is output from the second processing apparatus 12B through the second sub-processing based on the parameter "Z1" and the parameter "U". The output parameter "Y1" is transmitted to the parameter provision apparatus 11, and the parameter provision apparatus 11 determines input parameters "X2" and "Z2" of the second time on the basis of the output parameter "Y1". In this manner, the input parameter is changed every time a series of processing is performed once. A favorable value of the input parameter is searched for by iterating this processing.

To secure a certain level of accuracy of a search result, a series of processing is required to be executed a certain number of times. For example, the number of times of execution of a series of processing can be determined at 100 times. Further, for example, it is assumed that an execution period of the first sub-processing by the first processing apparatus 12A is 100 seconds, and an execution period of the second sub-processing by the second processing apparatus 12B is one second. In this case, it takes 101 seconds to execute a series of processing once (100 seconds for the first sub-processing+one second for the second sub-processing), and thus, a total required period of a series of processing becomes 10100 seconds (101 seconds per one time×100 times).

Meanwhile, in the present embodiment, the number of times of execution of a series of processing is reduced. While the number of times of execution of a series of processing is 100 times in a case of related art described above, in the present embodiment, the number of times of execution of a series of processing is reduced, and is, for example, set at 10 times. While accuracy of search degrades with the number of times of execution of 10 times, the second sub-processing which ends in a short period of time is executed a plurality of times in a series of processing to maintain accuracy of search as high as possible. For example, the second sub-processing is executed 100 times per one time of a series of processing. In this case, it takes a total of 200 seconds including 100 seconds for the execution period of the first sub-processing and 100 seconds for a total execution period of the second sub-processing (one second×100 times) in one time of a series of processing. While it takes a longer period to execute a series of processing once, the number of times of execution is reduced to 10 times, and thus, it takes a total of 2000 seconds (200×10) to execute a series of processing, which is reduced compared to the related art.

FIG. 3 is a diagram illustrating flow of a series of processing of the present embodiment. The first sub-processing by the first processing apparatus 12A is the same as the processing illustrated in FIG. 2. Meanwhile, the parameter provision apparatus 11 transmits 100 parameters from "Z1" to "Z100" (expressed as "{Z1, Z2, Z3, . . . , Z100}" in FIG. 3) to the second processing apparatus 12B as input parameters of the first time for the second sub-processing. The second processing apparatus 12B executes the second sub-processing for each of 100 parameters from "Z1" to "Z100". In other words, the second processing apparatus 12B executes the second sub-processing on the basis of parameters "U1" and "Z1", then, executes the second sub-processing on the basis of the parameters "U1" and "Z2", and then, executes the second sub-processing on the basis of the parameters "U1" and "Z3". The second sub-processing corresponding to 100 parameters from "Z1" to "Z100" is executed in this manner. Then, output parameters "Y1" to "Y100" of the second sub-processing are transmitted to the parameter provision apparatus 11. Note that FIG. 3 indicates parameters "U" and "Z" used for generation of a parameter "Yp" within parentheses after the parameter "Yp" ("p" is an integer equal to or greater than 1). For example, "Y2 (U1, Z2)" indicates that the parameter "Y2" is generated on the basis of the parameters "U1" and "Z2".

The parameter provision apparatus 11 determines an input parameter "U2" and the input parameters "Z101" to "Z200" to be used in a series of processing of the second time on the basis of the output parameters "Y1" to "Y100". In this manner, at least sub-processing which takes a shorter period is executed a plurality of times instead of each kind of sub-processing being executed once per one time of a series of processing. This minimizes degradation of performance of search even if the number of times of execution of a simulation is reduced. Thus, between the first input parameters and the second input parameters for one time of a series of processing, the number of input parameters used for processing which takes a shorter execution period, between the first sub-processing and the second sub-processing, is made larger. That is, when the processing period of the first sub processing is shorter than that of the second sub processing, the number of input parameters for the first sub processing is made larger than that of the second sub processing. When the processing period of the second sub processing is shorter than that of the first sub processing, the number of input parameters for the second sub processing is made larger than that of the first sub processing.

Note that for explanatory convenience, while one first parameter "X" is generated in the example in FIG. 3, the parameter provision apparatus 11 may generate a plurality of first parameters "X" at one time. For example, the parameter provision apparatus 11 may generate parameters "X1", "X2" and "X3" and transmit the parameters to the first processing apparatus 12A. In this case, the first processing apparatus 12A executes the first sub-processing for each of the parameters "X1", "X2" and "X3" and outputs first output parameters "U1", "U2" and "U3". Then, the second processing apparatus 12B executes the second sub-processing for each of the first output parameters "U1", "U2" and "U3". Note that the parameter provision apparatus 11 may generate the second parameter "Z" for each of the first output parameters "U1", "U2" and "U3". In a case where 100 second input parameters "Z" are generated in one time of a simulation as described above, second input parameters "Z1" to "Z100" may be generated for the first output parameter "U1", second input parameters "Z101" to "Z200" may be generated for the first output parameter "U2", and second input parameters "Z201" to "Z300" may be generated for the first output parameter "U3". Alternatively, the second input parameters "Z1" to "Z100" may be respectively combined with the first output parameters "U1", "U2" and "U3". Note that as described above, the number of the first input parameters per one time of a series of processing is made smaller than the number of the second input parameters per one time of a series of processing.

How the parameters are combined only requires to be designated in advance and stored in the storage 114. Further, in a case where information regarding how the parameters are combined is received from the management apparatus 13, information in the storage 114 may be updated.

Note that as described above, the parameters "X", "U", "Z" and "Y" include one or more elements. FIG. 4 is a diagram illustrating an example of the 1st first input parameter "X1". FIG. 4 indicates values for each element of the parameter "X". A k-th element of the parameter "X1" is expressed as "$x_{1\_k}$", and expressed using a lower-case alphabetic character and a subscript number. In the example in FIG. 4, the input parameter "X1" includes 50 elements of "$x_{1\_1}, x_{1\_2}, \ldots, x_{1\_50}$".

FIG. 5 is a diagram illustrating an example of the parameter "U". FIG. 5 indicates values for each element of the 1st first output parameter "U1". A k-th element of the parameter "U1" is expressed as "$u_{1\_k}$" and is expressed using a lower-case alphabetical character and a subscript number in a similar manner to the parameter "X1". In the example in FIG. 5, the input parameter "U1" includes 10 elements of "$u_{1\_1}, u_{1\_2}, \ldots, u_{1\_10}$".

FIG. 6 is a diagram illustrating an example of the parameter "Z". FIG. 6 indicates values for each element of 1st to 100th second input parameters "Z1" to "Z100". In the example in FIG. 6, the parameter "Z" includes two elements.

For example, a value of the 1st element "$Z_{1\text{-}1}$" of the parameter "Z1" is 0.5, and a 2nd element "$Z_{100\text{-}2}$" of the parameter "Z100" is 1.2.

FIG. 7 is a diagram illustrating an example of the parameter "Y". FIG. 7 indicates values for each element of 1st to 100th second output parameters "Y1" to "Y100". In the example in FIG. 7, the parameter "Y" includes six elements. For example, the 1st element "$Y_{1\text{-}1}$" of the parameter "Y1" is 1.8, and the 6th element "$Y_{100\text{-}6}$" of the parameter "Y100" is 2.4.

Note that it is assumed in the present embodiment that the input parameters generated by the parameter provision apparatus 11 are transmitted to the respective processing apparatuses 12, and the respective processing apparatuses 12 execute sub-processing using the input parameters. However, the input parameters may be transmitted to the management apparatus 13. A user who recognizes the input parameters via the management apparatus 13 may set the input parameters at the respective processing apparatuses 12. In other words, there can be a case where the parameter provision apparatus 11 do not automatically coordinate with the respective processing apparatuses 12.

Further, all the input parameters generated by the parameter provision apparatus 11 do not have to be used for the sub-processing. For example, in a case where it is determined that a total execution period of the sub-processing exceeds an upper limit value if all the received input parameters are used, the respective processing apparatuses 12 may select input parameters to be actually used among the received input parameters and may perform the sub-processing using the selected input parameters.

Note that a series of processing may include three or more sub-processing. In this case, the third and subsequent sub-processing uses output parameters of preceding sub-processing as input parameters in a similar manner to the second sub-processing. Thus, it can be said that a series of processing is constituted with a plurality of sub-processing which is to be executed in series. Further, output parameters of the subsequent sub-processing depend on output of the preceding sub-processing. Note that the third and subsequent sub-processing may receive the input parameters from the parameter provision apparatus 11 or may use only output parameters of the preceding sub-processing as the input parameters in a similar manner to the second sub-processing. Note that in a case where a series of processing includes three or more sub-processing, the last sub-processing is preferably sub-processing which is to be executed more times, and it is possible to prevent a period required for executing one time of a series of processing from becoming enormous by reducing input parameters to be provided to sub-processing other than the last sub-processing and increasing input parameters to be provided to the last sub-processing.

Details of the processing of the parameter provision apparatus 11 will be described along with components of the parameter provision apparatus 11.

The parameter generator 111 generates input parameters for respective sub-processing. Note that the input parameters corresponding to one time of a series of processing are generated for each time. In this event, more input parameters are generated for sub-processing which is to be executed more times than for sub-processing which is to be executed less times. Note that the number of generated input parameters may be determined in advance. Note that as described above, the second and subsequent sub-processing uses at least output parameters of the preceding sub-processing, and thus, the parameter generator 111 does not generate all input parameters of the respective processing apparatuses 12.

The parameter generator 111 generates new input parameters on the basis of input parameters which are determined as favorable on the basis of a result of the previous series of processing. Whether or not the input parameters are favorable is determined by the selector 113 which will be described later.

The input parameters may be generated using a method in related art. For example, Bayesian optimization (BO) or evolution strategy such as covariance matrix adaptation evolution strategy (CMA-ES) and genetic algorithm (GA) may be used. For example, parameters included in a function which indicates relationship between the input parameters selected so far and evaluation values may be updated on the basis of Gaussian process, or the like, and values of input parameters which make output of the updated function a maximum may be set as values of input parameters for the next time.

For example, in a case where Bayesian optimization is used, posterior probabilities of evaluation values for the input parameters are estimated in accordance with a Bayesian rule using combinations of the input parameters and evaluation values for output parameters generated by the input parameters. The posterior probability may be expressed as a relational expression between the input parameters and an average value and dispersion of the evaluation values. The relational expression of the average value and dispersion may be estimated using a method in related art such as Gaussian process regression and random forest regression.

For example, in a case where Gaussian process regression is used, an i-th (where "i" is an integer equal to or greater than 1) parameter among n evaluated target parameters is set as "$a_i$", a j-th ("j" is an integer equal to or greater than 1) parameter is set as "$a_j$", and an evaluation value corresponding to the element $a_i$ is set as "$b_i$". Further, it is assumed that an average value "$m_i$" of the evaluation value "$b_i$" is expressed as a function "$\mu_o(a_i)$", and covariance "$K_{i,j}$" of "$a_i$" and "$a_j$" is expressed as a function "$k(a_i, a_j)$". In other words, it is assumed that "$m_i = \mu_o(a_i)$" and "$k_{i,j} = k(a_i, a_j)$" hold. Note that "$\mu_o(a_i)$" is an arbitrary function, and "$k(a_i, a_j)$" is an arbitrary kernel function. The kernel function may use a method in related art, for example, squared exponential kernel, Matern kernel, linear kernel, Gaussian kernel, or the like. In this event, a relational expression "$\mu_n(a)$" of a parameter "a" and an average value of evaluation values "b" for the parameter "a" is expressed as the following expression.

$$\mu_n(a) = \mu_o(a) + k(a)^T(K + \sigma^2 \cdot I)^{-1}(B - m) \qquad \text{[Expression 1]}$$

Note that a vector "m" is a vector having an i-th element of "$m_i$", and a matrix "K" is a matrix having i, j elements of "$K_{i,j}$", a vector "k(a)" is a vector having an i-th element of "$k_i(a)$", and "$k_i(a) = k(a, a_i)$", and "$\sigma^2$" is an arbitrary constant. Further, a relational expression "$\sigma_n^2(a)$" of dispersion of the evaluation values "b" for the parameter "a" is expressed as the following expression.

$$\sigma_a^2(a) = k(a, a) - k(a)^T(K + \sigma^2 I)^{-1}k(a) \qquad \text{[Expression 2]}$$

The estimated posterior probabilities are used as an acquisition function. The acquisition function may use a method in related art such as probability of improvement (PI), expected improvement (EI), expected hypervolume improvement (EHVI), upper confidence bound (UCB), Thompson sampling (TS), entropy search (ES) and mutual information (MI). For example, in a case where PI is used as a method of the acquisition function, an acquisition function "$\alpha_n(A)$" for a parameter "A" can be calculated using the following expression using an arbitrary constant "$\tau_n$".

$$\alpha_n(A) = \int_{\tau_n}^{\infty} p(B|A) dB \quad \text{[Expression 3]}$$

The parameter generator 111 regenerates the input parameters so as to make the acquisition function as described above a maximum. The acquisition function may be maximized using a method in related art. For example, full search, random search, grid search, a gradient method, limited memory BFGS method (L-BFGS), Dividing REC-Tanble, CMA-ES, multi-start local search, or the like, may be used.

Note that there can be a case where a plurality of first input parameters are generated per one time of a series of processing, and the first sub-processing is executed for each of the first input parameters, in which case, local penalization may be performed. In other words, for some first input parameters, parameters may be regenerated so as to make the acquisition function a maximum, and for the remaining first input parameters, parameters may be regenerated by degrading a value of the acquisition function in preceding parameters.

Note that there can be a case where the parameter generator 111 generates random numbers on the basis of normal distribution, uniform distribution, or the like, and the generated random numbers are set as the input parameters. For example, the generated random numbers are set as the input parameters in a case where input parameters are generated for the first time, or in a case where the generated input parameters are not favorable and the input parameters are generated without depending on the previous input parameters. Further, pseudo random numbers may be generated using a Sobol sequence, latin hypercube sampling, or the like, and may be set as the input parameters. Further, values of the input parameters may be adjusted using evolution strategy. Still further, values of the parameters may be adjusted on the basis of a predetermined expression stored in the storage 114 in advance. Further, part of the input parameters to be generated may be randomly generated. Input parameters for few trials may be regenerated to have favorable values, and input parameters for many trials may be randomly generated.

The parameter generator 111 transmits the generated parameters to the respective processing apparatuses 12 which execute the sub-processing. In the present embodiment, the generated parameter "X" is transmitted to the first processing apparatus 12A, and the generated parameter "Z" is transmitted to the second processing apparatus 12B. Note that in a case where the first output parameter "U" is not directly transmitted from the first processing apparatus 12A to the second processing apparatus 12B, the parameter generator 111 may transmit the first output parameter "U" to the second processing apparatus 12B.

Further, as described above, there can be a case where the first processing apparatus 12A performs the first sub-processing a plurality of times on the basis of one parameter "X" and outputs parameters "U" which are different from each other. For example, there can be a case where the first processing apparatus 12A performs the first sub-processing three times on the basis of the parameter "X1" and outputs the parameters "U1", "U2" and "U3". In this case, the parameter generator 111 which has received the parameters "U1" to "U3" from the first processing apparatus 12A may transmit part of the parameters to the second processing apparatus 12B instead of transmitting all the parameters "U1" to "U3". For example, in a case where the number of combinations of the parameters "U" and "Z" exceeds a predetermined upper limit value, it takes too much time, and thus, the parameters "U" may be narrowed down in accordance with an execution period of the second sub-processing. A method for narrowing down the parameters may be determined as appropriate. The parameters to be narrowed down may be randomly selected or may be determined on the basis of values of respective elements.

Note that a range of values of parameters to be generated, a method for generating parameters, or the like, may be designated via the management apparatus 13. The designation only requires to be stored in the storage 114 and loaded upon generation of parameters. Further, the range, the method, or the like, may be designated for each of the elements of parameters or may be designated for all the elements of the parameters.

Further, the parameter generator 111 may determine settings regarding the sub-processing as well as generate parameters. For example, the parameter generator 111 may determine the number of times of execution of respective sub-processing in one time of a series of processing, that is, the number of input parameters in one time of a series of processing (the number of parameters "Z" in the present embodiment) on the basis of the execution period of the sub-processing of the respective processing apparatuses 12. For example, the number of input parameters for the respective sub-processing may be determined on the basis of an execution period "$t_1$" per one time of the first sub-processing, and an execution period "$t_2$" per one time of the second sub-processing. More specifically, a ratio of the execution period per one time of the first sub-processing to the execution period per one time of the second sub-processing may be set as the number of second input parameters "Z". In other words, the second input parameters "Z" corresponding to the number of the ratio "$t_1/t_2$" may be generated for one first input parameter "X". Further, the number of parameters "Z" for which a threshold is set so as not to exceed this ratio may be determined as appropriate. In such a case, the parameter generator 111 can be regarded as a manager which manages settings of the sub-processing.

The evaluation value calculator 112 calculates evaluation values for respective output parameters on the basis of an evaluation function which uses output parameters as arguments. The evaluation function may be determined as appropriate. For example, the evaluation function may be linear mapping, non-linear mapping such as a sigmoid function, or a combination of a plurality of methods. For example, in a case where ideal output parameters are known in advance, a difference between actual output parameters and the ideal output parameters may be set as the evaluation value. Further, a calculated value such as a sum, a product and a combination thereof of respective elements of the output parameters may be set as the evaluation value.

Further, the evaluation value calculator 112 may calculate one evaluation value for each parameter "Y" or may calculate a plurality of evaluation values. For example, a plurality of evaluation functions may be prepared, and evaluation values may be calculated respectively for the plurality of evaluation functions. Further, evaluation values for respective elements of the parameter "Y" may be calculated. A plurality of evaluation values may be calculated for respective elements of the parameter "Y" using a plurality of evaluation functions.

FIG. 8 is a diagram illustrating an example of an evaluation value to be calculated. In the example in FIG. 8, evaluation values for the parameter "Y" are calculated respectively for evaluation functions using two evaluation functions.

The selector 113 selects a favorable combination from combinations of input parameters corresponding to respective evaluation values, that is, combinations of input parameters used in the previous series of processing on the basis of the evaluation values from the evaluation value calculator 112. In the present embodiment, a favorable combination of the first input parameter "X" and the second input parameter "Z" is selected. Whether or not the combination is a favorable combination only requires to be determined on the basis of whether the evaluation value satisfies a condition for selection (selection condition). In other words, the parameter "Y" corresponding to the evaluation value which satisfies the selection condition is selected, and the parameters "X" and "Z" which have involved in generation of the selected parameter "Y" are selected.

The selection condition may be determined as appropriate. For example, in a case where evaluation is higher as the evaluation value is smaller, the parameter "Y" corresponding to a minimum evaluation value may be selected. In a case where evaluation is higher as the evaluation value is greater, the parameter "Y" corresponding to a maximum evaluation value may be selected. Further, in a case where a plurality of evaluation values are calculated for each parameter "Y", for example, a plurality of parameters "Y" are compared two by two, a parameter having more excellent evaluation values remains, and a parameter "Y" which is remaining at the end may be determined as the most favorable result. Alternatively, which of the two parameters "Y" is superior is determined on the basis of a sum of differences of respective evaluation values, and a parameter "Y" remaining at the end may be determined as an optimum parameter.

Further, in a case where there are a plurality of evaluation values which satisfy the selection condition, all the parameters "Y" corresponding to the evaluation values may be selected. For example, in the selection condition which selects parameters "Y" for which evaluation values are equal to or greater than a threshold, a plurality of parameters "Y" for which evaluation values are equal to or greater than the threshold may be selected. Further, for example, only the parameters "Y" under control of other parameters "Y" may be excluded from selection. In other words, only parameters "Y" for which all evaluation values of respective elements fall below evaluation values of other parameters "Y" may be excluded from selection.

Further, in a case where the parameter "Y" includes a plurality of elements, parameters "Y" which indicate non-inferior solutions to the selection condition for all elements may be selected. Note that non-inferior solutions indicate solutions which do not satisfy dominance relationship even if the solution is compared with any solution in a set of solutions which are available at the present moment. For example, a state where a solution "A" and a solution "B" satisfy relationship of "$A_L \geq B_L$" in the dimension "L" for all dimensions "L" is referred to as a state where the solution "A" is dominated by the solution "B", and a solution which is not dominated by any solution is referred to as a non-inferior solution.

Further, in a case where the parameter "Y" includes a plurality of elements, the parameter "Y" may be selected in descending order of rank of the selection condition. The rank is a set of rank of superiority and inferiority of a set of solutions which approximately follows the following procedure. If a certain set of solutions is provided, a set of solutions which become non-inferior solutions from the set of solutions is set as rank 1, and non-inferior solutions are obtained again from the original set of solutions from which the set of solutions (rank 1) is excluded, and set as rank 2. Subsequently, non-inferior solutions are obtained again from the original set of solutions from which the non-inferior solutions (rank 2) are excluded, and set as rank 3. A set of solutions with lower rank may be selected among all the sets of solutions subjected to ranking operation until the number of times of selection reaches a predetermined number.

Further, the evaluation value calculator 112 may select the output parameter "Y" on the basis of an evaluation value for a specific element among a plurality of elements of the output parameter "Y". Further, while pareto efficient global optimization (ParEGO), expected hypervolume improvement (EHVI), regret, entropy, or the like, is assumed as a method for calculating the evaluation value, the method may be determined as appropriate. Further, there may be one or a plurality of specific elements to be evaluated. In a case where there are a plurality of elements to be evaluated, it is only necessary to use a function which receives two or more values as input and outputs one value as an evaluation function, and the evaluation function may be either linear mapping or non-linear mapping. In a case where there is one element to be evaluated, a value of the element to be evaluated may be used as the evaluation value as is.

For example, a case where ParEGO is used will be described. In a case where elements of the output parameter "Y" to be used for calculation of the evaluation value are set as $y_0$ and $y_1$, and an i-th element of a weight parameter "W" is set as $w_i$, an evaluation value $g_{Tche}(y_0, y_1, w_i)$ based on ParEGO is expressed as the following expression.

$$g_{Tche}(y_0, y_1, w_i) = \max_{j=0}^{1}(w_j y_j) + 0.05(w_0 y_0 + w_1 y_1) \qquad \text{[Expression 4]}$$

Note that respective elements of the weight parameter "W" are sampled so as to satisfy the following expression.

$$W = \left\{(w_0, w_1) \mid w_0 + w_1 = 1 \wedge \forall j, w_j = \frac{l}{s}, l \in (0, \ldots, s)\right\} \qquad \text{[Expression 5]}$$

Note that in a case where the evaluation function is a weighted sum, an arbitrary real number which sets weight of each term of the evaluation function may be input. In this event, if coefficients regarding two elements $y_0$ and $y_1$ are set as $\alpha$ and $\beta$, the evaluation function $g_{weighted\ sum}$ is expressed with the following expression.

$$g_{weighted\ sum}(y_0, y_1) = \alpha \cdot y_0 + \beta \cdot y_1 \qquad \text{[Expression 6]}$$

In this manner, by setting elements of the output parameter to be evaluated and the evaluation function in accordance with a series of processing, accuracy of search of parameters is expected to be improved.

The number of the next input parameters may be prevented from explosively increasing by designating elements relating to selection, the number of selected elements, or the like, in this manner.

Note that in a case where there is no parameter which satisfies the selection condition, the input parameters do not have to be selected. In this case, the parameter generator 111 may adjust the input parameters created previously using evolution strategy, random numbers, or the like.

Note that as described above, there can be a case where a plurality of first input parameters are provided to the first sub-processing at one time. In this case, a favorable combination of input parameters is determined for each first input parameter. FIG. 9 is a diagram explaining selection. In the example in FIG. 9, the first input parameters "X1", "X2" and "X3" are provided to the first processing apparatus 12A at one time, and 100 second output parameters "Y" are generated for each first input parameter to calculate evaluation values "OBJ1" to "OBJ300". In this case, instead of comparing the evaluation values "OBJ1" to "OBJ300", the evaluation values "OBJ1" to "OBJ100" corresponding to the first input parameter "X1" are compared to perform selection, the evaluation values "OBJ101" to "OB3200" corresponding to the first input parameter "X2" are compared to perform selection, and the evaluation values "OB3201" to "OBJ300" corresponding to the first input parameter "X3" are compared to perform selection. The example in FIG. 9 indicates that a combination of parameters for which "YES" is described on the leftmost column in a table illustrated in FIG. 9 is selected as a favorable combination. In other words, in the example in FIG. 9, (X1, Y2), (X2, Y101) and (X3, Y300) are selected. In this manner, in a case where a plurality of first input parameters are generated, a combination of input parameters is selected for each first input parameter.

The storage 114 stores data necessary for processing of the present embodiment, a processing result, or the like. The data to be stored is not particularly limited, and, for example, input parameters to be used for respective sub-processing, output parameters of the respective sub-processing, or the like, are stored. Further, in a case where information regarding the respective sub-processing such as execution periods of the respective sub-processing is received from the respective processing apparatuses 12, these information may be stored.

FIG. 10 is a diagram illustrating an example of data regarding the selected parameters stored in the storage 114. The example in FIG. 10 indicates values of respective elements of the parameters "X" and "Z" selected as satisfying the selection condition. Further, the data also includes values of respective elements of the parameters "U" and "Y" corresponding to the selected parameters "X" and "Z", evaluation values, and information regarding respective sub-processing. In a case where the information regarding the respective sub-processing can be received from the respective processing apparatuses 12, the storage 114 may include such information in the data.

Further, the storage 114 may also store data including output parameters of the respective processing apparatuses 12 as well as the selected parameters. The data may also include information regarding the respective sub-processing received from the respective processing apparatuses 12, for example, required periods, or the like.

The determiner 115 determines whether to iterate a series of processing on the basis of a predetermined iteration condition. For example, a series of processing may be iterated until the number of times of execution of a series of processing exceeds a threshold or until a required period of a series of processing exceeds a threshold. Alternatively, in a case where evaluation is higher as the evaluation value is greater, in a case where the evaluation value of the selected parameter "Y" exceeds a threshold of the iteration condition, iteration may be stopped. Further, in a case where fluctuation of the evaluation value of the selected parameter "Y" successively falls within a predetermined range a predetermined number of times, iteration may be stopped. Still further, a plurality of iteration conditions may be provided, and in a case where equal to or larger than a predetermined number of iteration conditions among the plurality of iteration conditions are satisfied, iteration may be executed or stopped.

In a case where it is determined to iterate a series of processing, the determiner 115 instructs the parameter generator 111 to regenerate the input parameters and as described above, the parameter generator 111 generates the input parameters again on the basis of the selected input parameters. Thus, it can be said that the determiner 115 determines whether or not to execute regeneration of each input parameter on the basis of a predetermined condition.

In a case where it is determined not to iterate a series of processing, that is, in a case where it is determined not to regenerate input parameters, the determiner 115 may determine recommended input parameters. The recommended input parameters are recommendation values of the input parameters. The recommendation values may be values determined as optimal values by the determiner 115. A value of an input parameter corresponding to the best evaluation value may be regarded as an optimum value, or the optimum value may be determined by adjusting a value of the input parameter corresponding to the best evaluation value. For example, in a case where iteration is stopped because a certain evaluation value exceeds a threshold, an input parameter corresponding to the evaluation value may be regarded as the optimum value. Further, in a case where iteration is stopped because a required period of a series of processing exceeds a threshold, an input parameter with highest evaluation among the evaluation values so far may be regarded as the optimum value. Alternatively, an input parameter selected at last may be simply regarded as the optimum value.

The input/output device 116 controls input/output to/from the management apparatus 13. For example, the input/output device 116 may accept input of predetermined matters to be used for respective processing of the parameter provision apparatus 11, for example, the iteration condition, the selection condition, the parameters of the evaluation function, the elements to be evaluated, or the like, described above. In a case where the input is accepted, by the storage 114 updating the stored information, processing reflecting the input can be executed. Further, for example, the input/output device 116 may output respective processing results of the parameter provision apparatus 11 stored in the storage 114. For example, the input/output device 116 may output the recommended input parameters, a current number of times of iteration, the number of input parameters corresponding to one time of a series of processing, the numbers of times of execution of respective sub-processing and a series of processing, or the like. Further, the input/output device 116 may accept correction with respect to output settings, or the like. The correction is also reflected by the storage 114 updating the information. Further, the input/output device 116 may accept answer as to whether the selected input parameters are correct. In this case, values included in the evaluation function, such as a constant, may be changed so that selected input parameters can approach the accepted answer.

Further, input and output are performed in a format which is not particularly limited. For example, the management apparatus 13 may be a display apparatus such as a display, and an image indicating a graph, or the like, of the processing result may be output. A graph only requires to be generated using a method in related art.

Figure 11:
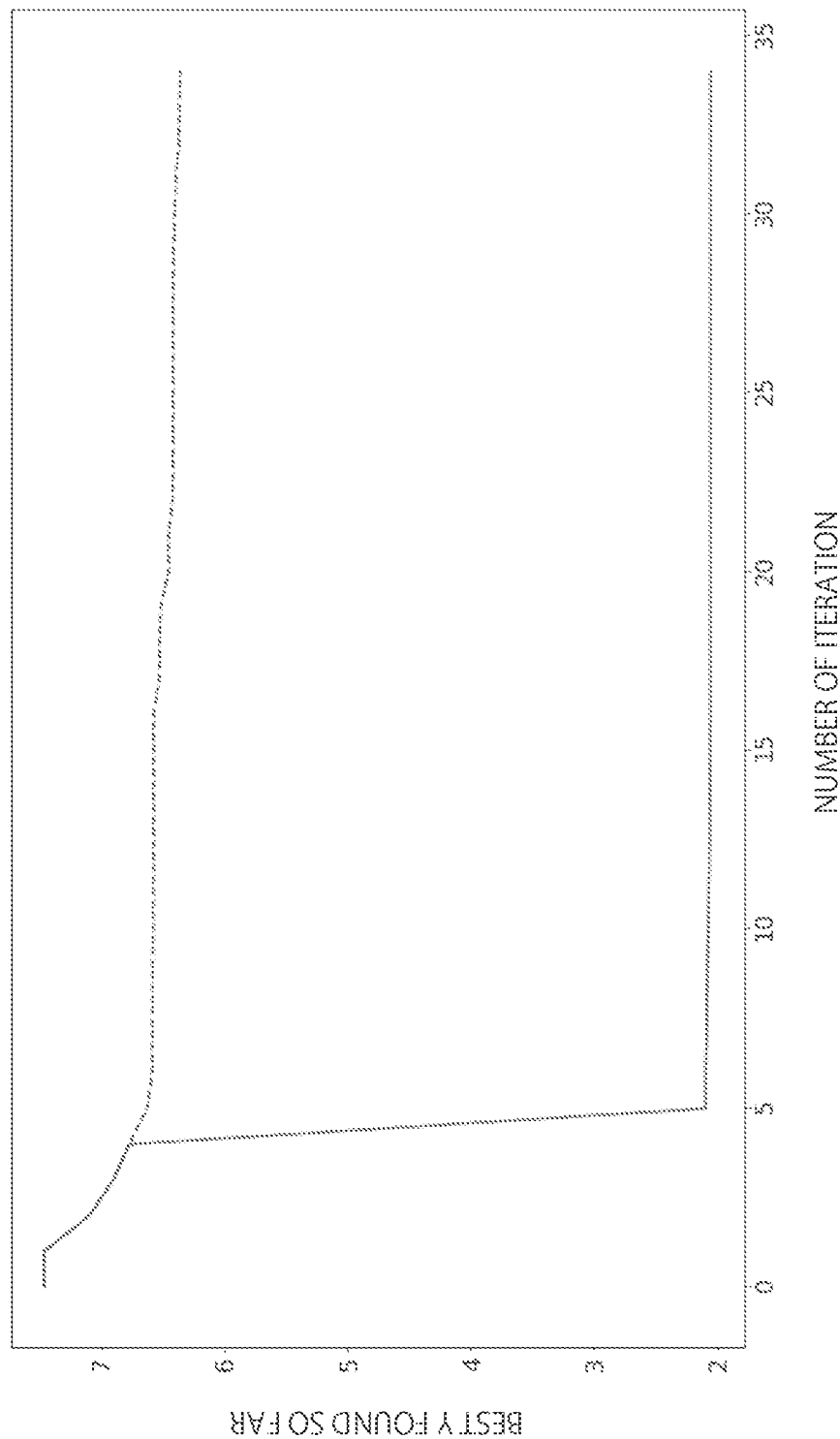
FIG. 11 is a diagram illustrating an example of output.

FIG. 11 is a diagram illustrating an example of output. The graph illustrated in FIG. 11 indicates relationship between the number of times of execution of a series of processing and an evaluation value of the parameter "Y" set as an optimum value. A dotted graph is a graph in a case where the input parameters are randomly generated, and a solid graph is a graph in a case where the input parameters are generated using Bayesian optimization. In this manner, results may be output for each generation method of the input parameters. This enables the user to recognize a favorable method for generating parameters.

Note that while it has been described that the parameter generator 111 transmits parameters to the respective processing apparatuses 12 for explanatory convenience, the parameters may be input/output to/from the respective processing apparatuses 12 via the input/output device 116.

Figure 12:
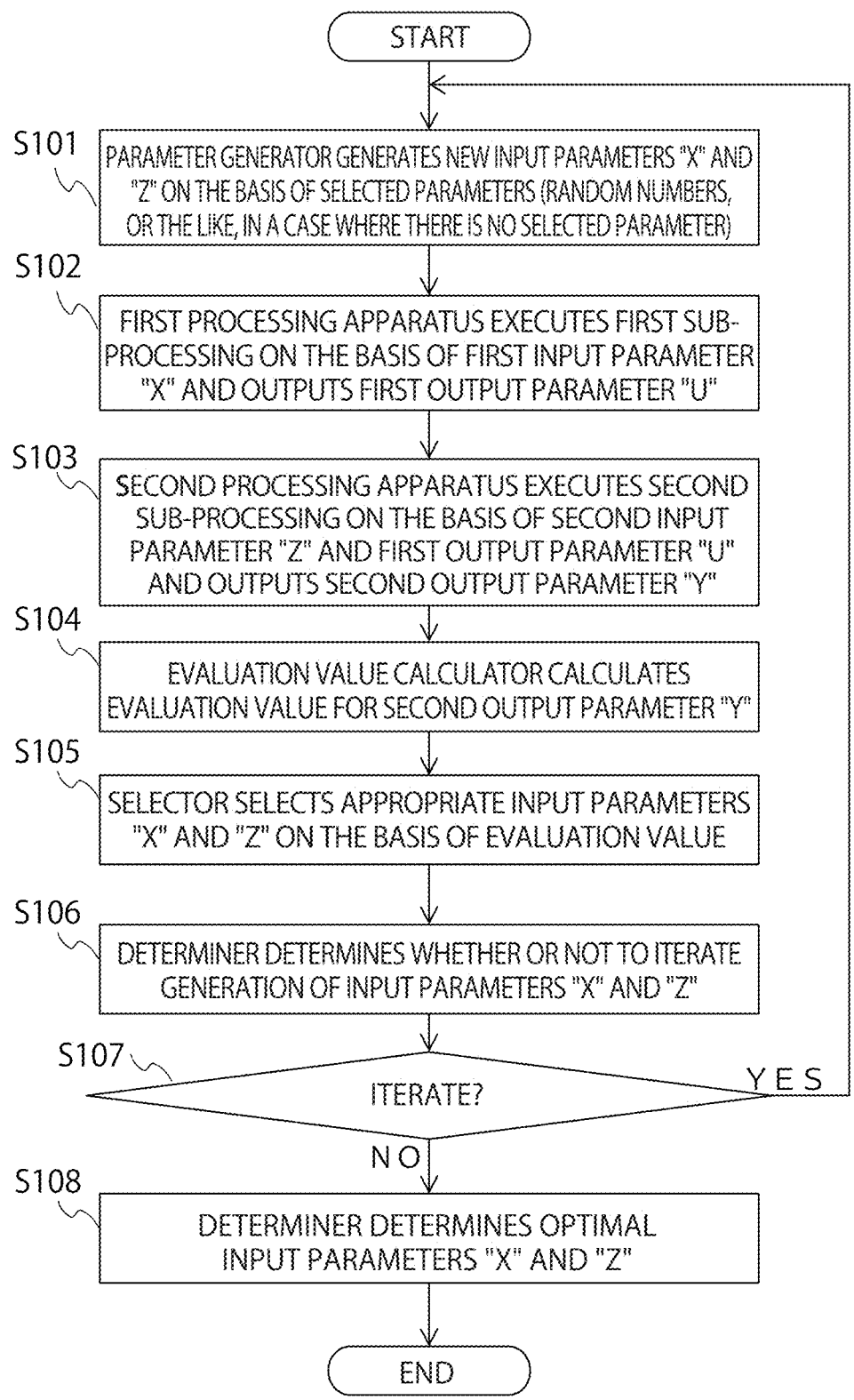
FIG. 12 is a schematic flowchart of a series of processing of the information processing system.

Flow of processing of the information processing system will be described. FIG. 12 is a schematic flowchart of a series of processing of the information processing system.

The parameter generator 111 of the parameter provision apparatus 11 generates the input parameters "X" and "Z" (S101). The input parameters "X" and "Z" are generated on the basis of the input parameters "X" and "Z" which are selected previously. In a case where there is no selected parameter, for example, in a case where the input parameters "X" and "Z" are generated for the first time, the input parameters "X" and "Z" are generated on the basis of random numbers, or the like, as described above. The first processing apparatus 12A receives the first input parameter "X" from the parameter provision apparatus 11, executes the first sub-processing on the basis of the first input parameter "X" and outputs the first output parameter "U" (S102). Then, the second processing apparatus 12B executes the second sub-processing on the basis of the second input parameter "Z" and the first output parameter "U" and outputs the second output parameter "Y" (S103). Both the second input parameter "Z" and the first output parameter "U" may be acquired from the parameter provision apparatus 11 or the first output parameter "U" may be acquired from the first processing apparatus 12A.

The evaluation value calculator 112 of the parameter provision apparatus 11 calculates the evaluation value for the second output parameter "Y" (S104), and the selector 113 selects favorable input parameters "X" and "Z" from the input parameters "X" and "Z" generated previously on the basis of the evaluation value (S105).

The determiner 115 determines whether or not to iterate generation of the input parameters "X" and "Z" on the basis of a predetermined condition (S106). In a case where it is determined to iterate generation (S107: Yes), the processing returns to the processing in S101, and the parameter generator 111 generates new input parameters "X" and "Z" again (S101). The processing from S101 to S106 is iterated in this manner until it is determined not to iterate generation, so that the generated input parameters "X" and "Z" become close to appropriate values. In a case where it is determined not to iterate generation (S107: No), the determiner 115 determines input parameters "X" and "Z" which are determined as optimum values (S108), and the flow ends.

Note that the flowchart in the present description is an example, and order of the flow may be replaced if the processing can be executed, and respective processing may be executed in parallel. For example, the determiner 115 may determine whether to iterate generation (S106) before calculating the evaluation value (S104). Further, the processing in S108 can be skipped in a case where it is not necessary to determine the input parameters "X" and "Z" which are determined as optimum values. In this manner, the flow may be adjusted as appropriate.

As described above, according to the present embodiment, in a case where values of parameters of a plurality of sub-processing included in a series of processing are determined, more candidates for values of parameters of sub-processing which is to be executed in a shorter period are provided than candidates for values of parameters of sub-processing which is to be executed in a longer period. Further, sub-processing which is to be executed in a shorter period is executed a plurality of times in one time of a series of processing to reduce the number of times of execution of a series of processing. This can prevent degradation of accuracy of values of parameters determined at last while reducing the number of times of execution of a series of processing.

Note that at least part of the above-described embodiment may be implemented with a dedicated electronic circuit (that is, hardware) such as an integrated circuit (IC) in which a processor, a memory, and the like, are mounted. Further, at least part of the above-described embodiment may be implemented by executing software (programs). For example, it is possible to implement processing of the above-described embodiment by using a general-purpose computer apparatus as basic hardware and causing a processor such as a CPU mounted on the computer apparatus to execute the programs.

For example, the apparatus of the above-described embodiment can be implemented as a computer by the computer reading out dedicated software stored in a computer-readable storage medium. A type of the storage medium is not particularly limited. Further, the apparatus of the above-described embodiment can be implemented as a computer by the computer installing dedicated software downloaded via a communication network. In this manner, information processing using software is specifically implemented using hardware resources.

Figure 13:
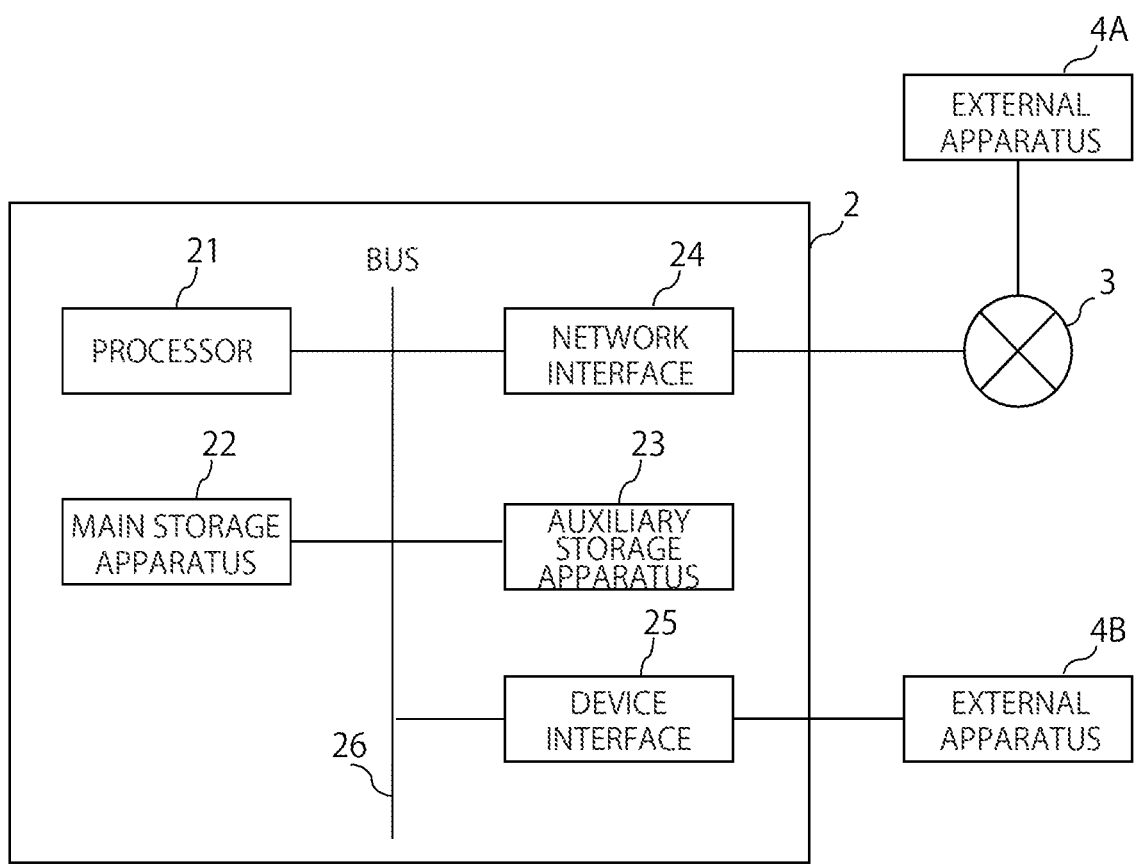
FIG. 13 is a block diagram illustrating an example of a hardware configuration in one embodiment of the present invention.

FIG. 13 is a block diagram illustrating an example of a hardware configuration in one embodiment of the present invention. The parameter provision apparatus 11 includes a processor 21, a main storage apparatus 22, an auxiliary storage apparatus 23, a network interface 24 and a device interface 25, and can be implemented as a computer apparatus 2 in which these are connected via a bus 26. The storage 114 can be implemented by the main storage apparatus 22 or the auxiliary storage apparatus 23, and components other than the storage 114, such as a software execution detector can be implemented by the processor 21.

Note that while the computer apparatus 2 in FIG. 13 includes components one each, the computer apparatus 2 may include a plurality of the same components. Further, while FIG. 13 illustrates one computer apparatus 2, software may be installed on a plurality of computer apparatuses, and each of the plurality of computer apparatuses may execute different part of processing of the software.

The processor 21 is an electronic circuit including a control apparatus and a computation apparatus of the computer. The processor 21 performs computation processing on the basis of data and a program input from each apparatus, or the like, of an internal configuration of the computer apparatus 2 and outputs a computation result and a control signal to each apparatus, or the like. Specifically, the processor 21 controls respective components constituting the computer apparatus 2 by executing an operating system (OS) of the computer apparatus 2, application, or the like. The processor 21 is not particularly limited, if the processor 21 can perform the above-described processing.

The main storage apparatus 22 is a storage apparatus which stores a command, various kinds of data, or the like, to be executed by the processor 21, and information stored in the main storage apparatus 22 is directly read out by the processor 21. The auxiliary storage apparatus 23 is a storage apparatus other than the main storage apparatus 22. Note that these storage apparatuses mean arbitrary electronic parts in which electronic information can be stored, and may be a memory or a storage. Further, while the memory includes a volatile memory and a non-volatile memory, either one may be used.

The network interface 24 is an interface for connecting to the communication network 3 in a wireless or wired manner. As the network interface 24, it is only necessary to use one complying with existing communication standards. It is possible to communicably connect the computer apparatus 2 to an external apparatus 4A via the communication network 3 using the network interface 24 for exchange of information.

The device interface 25 is an interface such as a USB which directly connects to an external apparatus 4B. The external apparatus 4B may be either an external storage medium or a storage apparatus such as a database.

The external apparatuses 4A and 4B may be output apparatuses. The output apparatus may be, for example, a display apparatus which displays an image or an apparatus which outputs speech, or the like. For example, the output apparatus includes, but not limited to, a liquid crystal display (LCD), a cathode ray tube (CRT), a plasma display panel (PDP), and a speaker.

Note that the external apparatuses 4A and 4B may be input apparatuses. The input apparatus includes a device such as a keyboard, a mouse, a touch panel, and provides information input through these devices to the computer apparatus 2. A signal from the input apparatus is output to the processor 21.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The description of the application and the claims should be interpreted as generally understood by those skilled in the art and should not be overly limiting. For example, the statement "using at least one of A and B" means that only A may be used, only B may be used, or both A and B may be used.

The invention claimed is:

1. An information processing apparatus comprising processing circuitry configured to:
   calculate evaluation values for output parameters of a series of processing including first processing and second processing, the first processing using first input parameters and the second processing using second input parameters, one of the first processing and the second processing having a shorter processing period than the other one of the first processing and the second processing;
   select at least some of the output parameters on a basis of the evaluation values; and
   regenerate the first input parameters and the second input parameters on a basis of first input parameters and second input parameters corresponding to the selected output parameters, wherein
   the first input parameters and the second input parameters are generated for the series of processing, and
   a number of input parameters generated for the one of the first processing and the second processing having a shorter processing period is larger than a number of input parameters generated for the other one of the first processing and the second processing.

2. The information processing apparatus according to claim 1, wherein a number of the second input parameters to be regenerated are determined on a basis of an execution period per the first processing and an execution period per the second processing.

3. The information processing apparatus according to claim 2, wherein a ratio of the execution period per the first processing to the execution period per the second processing is set as the number of the second input parameters to be regenerated.

4. The information processing apparatus according to claim 1, wherein
   the second processing further uses output parameters of the first processing included in the output parameters, and
   the second input parameters are generated corresponding to the first input parameters.

5. The information processing apparatus according to claim 1, wherein the processing circuitry is configured to determine whether or not to execute regeneration of the first input parameters and the second input parameters on a basis of a predetermined condition and, if it is determined not to execute the regeneration, determine a recommendation value of at least one of the first input parameters or the second input parameters.

6. The information processing apparatus according to claim 1, wherein the processing circuitry is configured to output a recommendation value of at least one of the first input parameters or the second input parameters.

7. The information processing apparatus according to claim 1, wherein the first input parameters and the second input parameters are regenerated so that values of the first input parameters or the second input parameters fall within a predetermined range.

8. The information processing apparatus according to claim 1, wherein
   the evaluation values are calculated for two or more elements included in the output parameters of the series of processing, and
   one of the output parameters to be selected is determined on a basis of one of the evaluation values corresponding to a predetermined element of the elements.

9. The information processing apparatus according to claim 1, wherein the evaluation values are calculated on a basis of a predetermined evaluation function.

10. The information processing apparatus according to claim 1, wherein
    parameters of a relational expression expressing relationship between the first input parameters and the evaluation values are updated on a basis of the first input parameters and the evaluation value, and
    the first input parameters are regenerated on a basis of the relational expression including the updated parameters.

11. The information processing apparatus according to claim 1, further comprising
    an input device configured to accept information to be used in processing of the processing circuitry, wherein the processing of the processing circuitry is changed on a basis of information accepted via the input device.

12. The information processing apparatus according to claim 1, wherein the second input parameters are randomly generated.

13. An information processing method comprising:
calculating evaluation values for output parameters of a series of processing including first processing and second processing, the first processing using first input parameters and the second processing using second input parameters, one of the first processing and the second processing having a shorter processing period than the other one of the first processing and the second processing;
selecting at least some of the output parameters on a basis of the evaluation values; and
regenerating the first input parameters and the second input parameters on a basis of first input parameters and second input parameters corresponding to the selected output parameters, wherein
the first input parameters and the second input parameters are generated for the series of processing, and
a number of input parameters generated for the one of the first processing and the second processing having a shorter processing period is larger than a number of input parameters generated for the other one of the first processing and the second processing.

14. A non-transitory storage medium in which a program to be executed by a computer is stored, the program causing the computer to execute:
calculating evaluation values for output parameters of a series of processing including first processing and second processing, the first processing using first input parameters and the second processing using second input parameters, one of the first processing and the second processing having a shorter processing period than the other one of the first processing and the second processing;
selecting at least some of the output parameters on a basis of the evaluation values; and
regenerating the first input parameters and the second input parameters on a basis of first input parameters and second input parameters corresponding to the selected output parameters, wherein
the first input parameters and the second input parameters are generated for the series of processing, and
a number of input parameters generated for the one of the first processing and the second processing having a shorter processing period is larger than a number of input parameters generated for the other one of the first processing and the second processing.

15. An information processing system comprising:
one or more processing execution apparatuses configured to execute respective processing included in a series of processing including first processing and second processing, the first processing using first input parameters and the second processing using a second input parameters, one of the first processing and the second processing having a shorter processing period than the other one of the first processing and the second processing; and
an information processing apparatus configured to generate the first input parameters and the second input parameters, wherein
the information processing apparatus includes processing circuitry configured to:
calculate evaluation values for output parameters of the series of processing,
select at least some of the output parameters on a basis of the evaluation values, and
regenerate the first input parameters and the second input parameters on a basis of first input parameters and second input parameters corresponding to the selected output parameters,
the first input parameters and the second input parameters are generated for the series of processing,
a number of input parameters generated for the one of the first processing and the second processing having a shorter processing period is larger than a number of input parameters generated for the other one of the first processing and the second processing,
the one or more processing execution apparatuses execute the first processing for each of the first input parameters corresponding to one time of the series of processing and execute the second processing for each of the second input parameters corresponding to one time of the series of processing while the series of processing is executed once, and
the output parameters are generated for each of the second input parameters corresponding to one time of the series of processing.

* * * * *